(12) United States Patent
Hollar, Jr. et al.

(10) Patent No.: US 9,617,380 B2
(45) Date of Patent: Apr. 11, 2017

(54) THERMAL ENHANCEMENT OF THE PURIFICATION PROCESS FOR INTERFACIAL POLYCARBONATE AND COPOLYMER POLYCARBONATES

(71) Applicant: SABIC Global Technologies B.V., Bergen op Zoom (NL)

(72) Inventors: William E. Hollar, Jr., Mount Vernon, IN (US); Zeljko Kuzeljevic, Evansville, IN (US); Mohan Khadilkar, Mount Vernon, IN (US); Donald Paciorkowski, New Harmony, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 14/907,369

(22) PCT Filed: Jul. 25, 2014

(86) PCT No.: PCT/US2014/048239
§ 371 (c)(1),
(2) Date: Jan. 25, 2016

(87) PCT Pub. No.: WO2015/013641
PCT Pub. Date: Jan. 29, 2015

(65) Prior Publication Data
US 2016/0177029 A1 Jun. 23, 2016

Related U.S. Application Data

(60) Provisional application No. 61/858,285, filed on Jul. 25, 2013.

(51) Int. Cl.
C08G 64/00 (2006.01)
C08G 64/40 (2006.01)
C08G 63/06 (2006.01)

(52) U.S. Cl.
CPC ......... C08G 64/403 (2013.01); C08G 64/406 (2013.01)

(58) Field of Classification Search
CPC .................................... C08G 64/406
USPC ........................ 528/196, 198, 502
See application file for complete search history.

(56) References Cited

U.S. PATENT DOCUMENTS

| | | | |
|---|---|---|---|
| 3,666,719 A | 5/1972 | Morgenstern et al. | |
| 4,154,775 A | 5/1979 | Axelrod | |
| 4,191,685 A | 3/1980 | Haaf et al. | |
| 4,316,009 A | 2/1982 | Rinaldi et al. | |
| 4,692,490 A | 9/1987 | Abolins | |
| 6,420,517 B1 | 7/2002 | Van Gool et al. | |
| 6,458,920 B1 | 10/2002 | Baxendell et al. | |
| 7,517,944 B2 | 4/2009 | Kunishi et al. | |
| 2016/0168322 A1* | 6/2016 | Gautam ................. | C08G 64/24 528/201 |
| 2016/0168323 A1* | 6/2016 | Hollar, Jr. ............ | C08G 64/406 528/201 |

FOREIGN PATENT DOCUMENTS

| | | |
|---|---|---|
| CN | 102604067 A | 7/2012 |
| EP | 1020483 A2 | 7/2000 |
| GB | 2043083 A | 10/1980 |
| WO | 0224784 A1 | 3/2002 |

OTHER PUBLICATIONS

International Search Report for International Application No. PCT/US2014048239, International filing date Jul. 25, 2014, Date of mailing Nov. 28, 2014, 4 pages.
Written Opinon for International Application No. PCT/US2014/048239; International filing date Jul. 25, 2014, Date of mailing Nov. 28, 2014, 5 pages.
Cheng et al.; "Improvement of washing and separation process for polycarbonate"; Cheng Reference_MT_ENG; 现代化工 vol. 33, No. 2; 2013; 7 pages.

* cited by examiner

*Primary Examiner* — Terressa Boykin
(74) *Attorney, Agent, or Firm* — Cantor Colburn LLP

(57) ABSTRACT

In an embodiment, a process of purifying a polycarbonate comprises: polymerizing a dihydroxy compound and a carbonate source via an interfacial reaction in the presence of a catalyst to form a product mixture comprising an aqueous phase and an organic phase, wherein the organic phase comprises the polycarbonate, the catalyst, ions, and a solvent having a boiling point $T_b$; heating the product mixture to greater than or equal to $T_b$; separating the aqueous phase and the organic phase at a temperature greater than or equal to $T_b$ to form a separated organic phase and a separated aqueous phase; extracting the catalyst from the separated organic phase; and extracting the ions from the separated organic phase; wherein if a centrifuge is used in the extracting of the catalyst, the extracting of the ions, or both, the process further comprises cooling a stream entering the centrifuge to less than $T_b$.

20 Claims, 8 Drawing Sheets

US 9,617,380 B2

THERMAL ENHANCEMENT OF THE PURIFICATION PROCESS FOR INTERFACIAL POLYCARBONATE AND COPOLYMER POLYCARBONATES

CROSS REFERENCE TO RELATED APPLICATIONS

This application is a National Stage application of PCT/US2014/048239, filed Jul. 25, 2014, which claims the benefit of U.S. Provisional Application No. 61/858,285, filed Jul. 25, 2013; which are incorporated by reference in their entirety herein.

BACKGROUND

Interfacial processes for the polymerization of polycarbonates yield a mixture comprising an aqueous phase and an organic phase. The aqueous phase, also referred to as the brine phase, comprises salts, ionic species, and interfacial catalyst. The organic phase, also referred to as the resin phase or polymer phase, comprises solvent, dissolved polycarbonate, and interfacial catalyst. Some salts and ionic species (collectively, "ions") can further be present in the organic phase as a result of brine entrainment from the aqueous phase. These ions, as well as any interfacial catalyst are generally removed from a separated organic phase in a purification process as they affect the final product quality. Such a purification process generally involves separation of the aqueous phase from the organic phase followed by the removal of catalyst and ions in one or more extraction steps to result in a purified polycarbonate.

In order to obtain efficient separation at economical throughputs, a typical process uses a series of high revolution per minute (rpm) disk stack centrifuges. Centrifuges are effective for separations but are expensive. They also tend to require significant electrical energy input and have maintenance costs. Emulsification is another problem that can impact the purification process, particularly in the purification of some copolycarbonates.

A purification process with lower cost, improved separation, or both is desirable.

BRIEF DESCRIPTION

Disclosed herein is a method for the purification of a polycarbonate.

In an embodiment, a process of purifying a polycarbonate comprises: polymerizing a dihydroxy compound and a carbonate source via an interfacial reaction in the presence of a catalyst to form a product mixture comprising an aqueous phase and an organic phase, wherein the organic phase comprises the polycarbonate, the catalyst, ions, and a solvent having a boiling point $T_b$ at atmospheric pressure; heating the product mixture to a temperature greater than or equal to the boiling point $T_b$ to form a heated product mixture; separating the aqueous phase and the organic phase of the heated product mixture at a temperature greater than or equal to the boiling point $T_b$ to form a separated organic phase and a separated aqueous phase; extracting the catalyst from the separated organic phase; and extracting the ions from the separated organic phase to form a purified polycarbonate; wherein if a centrifuge is used in the extracting of the catalyst, the extracting of the ions, or both, the process further comprises cooling a stream entering the centrifuge to a temperature less than the boiling point $T_b$.

In another embodiment, a process of purifying polycarbonate comprises: polymerizing a dihydroxy compound and a carbonate source via an interfacial reaction in the presence of a catalyst to provide a product mixture comprising an aqueous phase and an organic phase, wherein the organic phase comprises the polycarbonate, the catalyst, ions, and a solvent having a boiling point $T_b$ at atmospheric pressure; separating the aqueous phase and the organic phase via a centrifuge to form a separated organic phase and a separated aqueous phase; heating the separated organic phase to a temperature greater than or equal to the boiling point $T_b$ to form a heated separated organic phase; extracting the catalyst from the heated separated organic phase; and extracting the ions from the heated separated organic phase to form a purified polycarbonate; wherein at least one of the extracting the catalyst and the extracting the ions occurs by other than a centrifuge at a temperature greater than or equal to the boiling point $T_b$, and if the extracting the catalyst or the extracting the ions occurs with a centrifuge, then the heating occurs after the extracting the catalyst or the extracting the ions occurs with the centrifuge, or the process further comprises cooling a stream entering the centrifuge to a temperature of less than the boiling point $T_b$.

In another embodiment: a process of purifying polycarbonate comprises: polymerizing a dihydroxy compound and a carbonate source via an interfacial reaction in the presence of a catalyst to form a product mixture comprising an aqueous phase and an organic phase, wherein the organic phase comprises the polycarbonate, the catalyst, ions, and a solvent having a boiling point $T_b$ at atmospheric pressure; heating the product mixture to a temperature greater than or equal to the boiling point $T_b$ to provide a heated product mixture; separating the aqueous phase and the organic phase of the heated product mixture at a temperature greater than or equal to the boiling point $T_b$ to form a separated organic phase and a separated aqueous phase, wherein the separating is by one or both of a separating coalesce and a decanter; extracting the catalyst from the separated organic phase in a first extraction column to form a reduced catalyst organic stream; and extracting the ions from the reduced catalyst organic stream by combining the reduced catalyst organic stream with an aqueous stream in a decanter to form a purified polycarbonate; wherein the separated organic phase, the reduced catalyst organic stream, the aqueous stream, or a combination comprising at least one of the foregoing are at a temperature greater than or equal to the boiling point $T_b$ during the extracting the catalyst and the extracting the ions.

In yet another embodiment: a process of purifying polycarbonate comprises: polymerizing a dihydroxy compound and a carbonate source via an interfacial reaction in the presence of a catalyst to provide a product mixture comprising an aqueous phase and an organic phase, wherein the organic phase comprises the polycarbonate, the catalyst, ions, and a solvent having a boiling point $T_b$ at atmospheric pressure; heating the product mixture to a temperature greater than or equal to the boiling point $T_b$; separating the aqueous phase and the organic phase of the heated product mixture at a temperature greater than or equal to the boiling point $T_b$ to form a separated organic phase and a separated aqueous phase, wherein the separating is by a decanter; extracting the catalyst from the separated organic phase in a first extraction column to provide a reduced catalyst organic stream; and extracting the ions from the reduced catalyst organic stream by combining the reduced catalyst stream with an aqueous stream in a coalescing decanter to form a purified polycarbonate; wherein the separated organic phase, the reduced catalyst organic stream, the aqueous stream, or a combination comprising at least one of the foregoing are at a temperature greater than or equal to the boiling point $T_b$ during extracting the residual catalyst and the extracting the ions.

The above described and other features are exemplified by the following figures and detailed description.

BRIEF DESCRIPTION OF THE DRAWINGS

Refer now to the figures, which are exemplary embodiments, and wherein the like elements are numbered alike.

DETAILED DESCRIPTION

Figure 1:
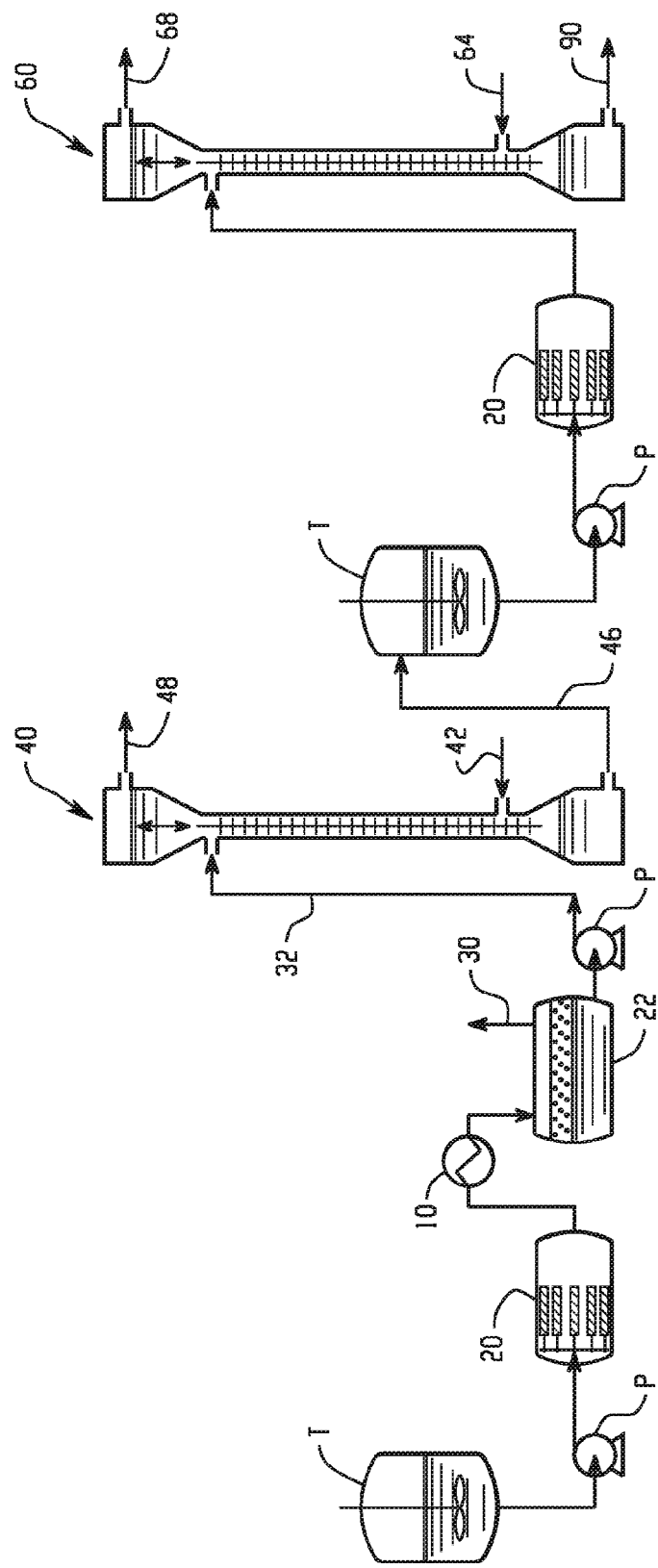
FIG. 1 is a schematic diagram of a purification process utilizing two coalescers, a heat exchanger, a decanter, and dual extraction columns.

The interfacial polymerization to form polycarbonate results in a product mixture comprising an aqueous phase (also referred to as a brine phase) and an organic phase (also referred to as a polymer phase) that comprises an organic solvent (also referred to herein as the solvent) and the polycarbonate. Purification processes to purify the polycarbonate from the organic phase are generally performed at temperatures below the boiling point of the solvent in order to prevent the solvent from boiling off. For example, purification processes utilizing the solvent, dichloromethane, are generally performed at a temperature of less than 40 degrees Celsius (° C.), or at a temperature of less than or equal to 35° C., or at a temperature of less than or equal to 30° C., for example, 20° C. to 40° C. When centrifuges are used for purification, maintaining a temperature below that of the solvent boiling point is important, as centrifuges cannot successfully be operated under increased pressure and therefore high solvent loss at elevated temperatures is unavoidable.

It was surprisingly discovered that a purification process to purify polycarbonate after an interfacial polymerization can be successfully performed at elevated temperatures, with the proviso that if the purification process utilizes a centrifuge, that a stream entering the centrifuge enters at a temperature below a boiling temperature of the solvent. For example, a heat exchanger to increase the temperature of the solution can be employed before one or more of a phase separation step, a catalyst extraction step, and an ion extraction step. If a centrifuge is used in the phase separation step, then a heat exchanger to increase the solution temperature can be located downstream of the centrifuge such that the separated organic phase can be heated to a temperature greater than or equal to the boiling point of the solvent after centrifugation, and prior to subsequent purification step(s), such as extraction of the catalyst and/or ions from the organic phase. Likewise, if a centrifuge is used in an extraction step, then the temperature of the previously heated stream entering the centrifuge can be cooled prior to entering.

The elevated temperature can be at a temperature of greater than or equal to the boiling point of the organic solvent. For example, if the solvent is dichloromethane that has a boiling point of 39.6° C., then the elevated temperature can be greater than 39.6° C., specifically, greater than or equal to 40° C., for example, 40 to 150° C., specifically, 50 to 150° C., more specifically, 60 to 100° C., at a pressure greater than or equal to atmospheric pressure. In other words, the temperature can be greater than or equal to the boiling temperature of the solvent $(T_b)$ at atmospheric pressure, specifically, greater than or equal to $T_b+5°$ C., more specifically, greater than or equal to $T_b+10°$ C., and even to a temperature that is $T_b+20°$ C. to $T_b+60°$ C. As used herein, $T_b$ is determined at atmospheric pressure. It was found that operating at an elevated temperature can result in one or more of a decreased solution viscosity, increased diffusion coefficients, and decreased emulsification tendencies.

"Decreased solution viscosity" can mean, for example, that the ratio of a viscosity of the solution with the elevated temperature to a viscosity of the solution at 30° C. is less than 1, specifically, 0.001 to 0.95, more specifically, 0.01 to 0.9, even more specifically, 0.1 to 0.9. For example, the decrease in solution viscosity of a mixture comprising 15 wt % on a solids basis of a polycarbonate having a weight average molecular weight of 30,500 Daltons is shown in the Table below.

| T (° F.) | T (° C.) | Viscosity (cP) |
|---|---|---|
| 90 | 32.2 | 239 |
| 110 | 43.3 | 194 |
| 130 | 54.4 | 160 |
| 150 | 65.6 | 134 |
| 170 | 76.7 | 114 |

A decreased solution viscosity can enhance the separation of the two phases and can improve contact of a water wash that can be performed to remove ions from the organic phase.

"Increased diffusion coefficient" can mean, for example, that the ratio of the diffusion coefficient of the solution with the elevated temperature to a diffusion coefficient of the solution at 30° C. is less than 1, specifically, 0.001 to 0.95, more specifically, 0.01 to 0.9, even more specifically, 0.1 to 0.9. An increase in diffusion coefficients can result in enhanced catalyst extraction during an acid wash.

"Decreased emulsification tendency" can mean, for example, that the ratio of average droplet size at 30° C. to average droplet size at the elevated temperature is less than 1, specifically, 0.001 to 0.98, more specifically, 0.01 to 0.9, even more specifically, 0.1 to 0.9. Alternatively, "decreased emulsification tendency" can mean that the ratio of settling time at 30° C. to settling time at the elevated temperature is less than 1, specifically, 0.001 to 0.95, more specifically, 0.01 to 0.9, even more specifically, 0.1 to 0.9. Decreased emulsification tendencies can allow more intensive mixing to be used with reduced or eliminated emulsification, or finer droplet sizes, which can significantly improve separation.

Thus, the increased stream temperature can allow for one or both of a decreased residence time of the stream in a separation unit and the ability to replace large separation units with smaller separation units while maintaining the same or similar purification rates.

"Polycarbonate" as used herein means a homopolymer or copolymer having repeating structural carbonate units of formula (1)

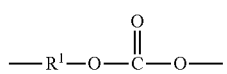

wherein at least 60 percent of the total number of $R^1$ groups are aromatic, or each $R^1$ contains at least one $C_{6-30}$ aromatic group. Specifically, each $R^1$ can be derived from a dihydroxy compound such as an aromatic dihydroxy compound of formula (2) or a bisphenol of formula (3).

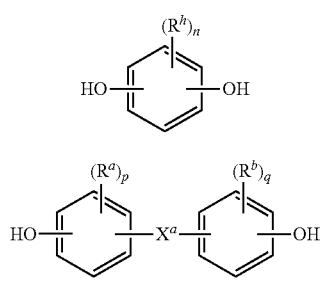

In formula (2), each $R^h$ is independently a halogen atom, for example, bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (3), $R^a$ and $R^b$ are each independently a halogen, $C_{1-12}$ alkoxy, or $C_{1-12}$ alkyl; and p and q are each independently integers of 0 to 4, such that when p or q is less than 4, the valence of each carbon of the ring is filled by hydrogen. In an embodiment, p and q is each 0, or p and q is each 1, and $R^a$ and $R^b$ are each a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

Some illustrative examples of specific dihydroxy compounds include the following: bisphenol compounds such as 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl) sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole; substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like.

Specific dihydroxy compounds include resorcinol, 2,2-bis(4-hydroxyphenyl) propane ("bisphenol A" or "BPA", in which each of $A^1$ and $A^2$ is p-phenylene and $Y^1$ is isopropylidene in formula (3)), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane (DMBPC), and 1,1-bis(4-hydroxy-3-methylphenyl)-3,3,5-trimethylcyclohexane (isophorone bisphenol).

"Polycarbonate" as used herein also includes copolymers comprising carbonate units and other types of polymer units, such as siloxane units ("polysiloxanecarbonates") and ester units ("polyestercarbonates", also known as polyester-polycarbonates). Polyestercarbonates further contain, in addition to recurring carbonate chain units of formula (1), repeating ester units of formula (4)

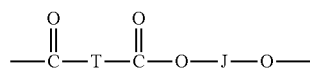

wherein J is a divalent group derived from a dihydroxy compound, and can be, for example, a $C_2$-10 alkylene, a $C_{6-20}$ cycloalkylene a $C_{6-20}$ arylene, or a polyoxyalkylene group in which the alkylene groups contain 2 to 6 carbon atoms, specifically, 2, 3, or 4 carbon atoms; and T is a divalent group derived from a dicarboxylic acid, and can be, for example, a $C_2$-10 alkylene, a $C_{6-20}$ cycloalkylene, or a $C_{6-20}$ arylene. Copolyesters containing a combination of different T and/or J groups can be used. The polyesters can be branched or linear.

Specific dihydroxy compounds include aromatic dihydroxy compounds of formula (2) (e.g., resorcinol), bisphenols of formula (3) (e.g., bisphenol A), an aliphatic diol such as ethane diol, n-propane diol, i-propane diol, 1,4-butane diol, 1,4-cyclohexane diol, 1,4-hydroxymethylcyclohexane, or a combination comprising at least one of the foregoing dihydroxy compounds. Aromatic dicarboxylic acids that can be used include terephthalic acid, isophthalic acid, naphthalene dicarboxylic acid, 1,4-cyclohexane dicarboxylic acid, or a combination comprising at least one of the foregoing acids. A combination of isophthalic acid and terephthalic acid wherein the weight ratio of isophthalic acid to terephthalic acid is 91:9 to 2:98 can be used. Specific ester units include ethylene terephthalate, n-propylene terephthalate, n-butylene terephthalate 1,4-cyclohexanedimethylene terephthalate, and ester units derived from isophthalic acid, terephthalic acid, and resorcinol (ITR).

The molar ratio of ester units to carbonate units in the copolymers can vary broadly, for example, 1:99 to 99:1, specifically, 10:90 to 90:10, more specifically, 25:75 to 75:25. Specific polyestercarbonates are those including bisphenol A carbonate units and isophthalate-terephthalate-bisphenol A ester units, also commonly referred to as poly(carbonate-ester)s (PCE) poly(phthalate-carbonate)s (PPC), depending on the molar ratio of carbonate units to ester units.

In a specific embodiment, the polycarbonate is a linear homopolymer comprising bisphenol A carbonate units (BPA PC). However, the low shear processes described herein are especially useful for the purification of polyesters such as PPC and PEC, and copolycarbonates including bisphenol A and bulky bisphenol carbonate units, i.e., carbonate units derived from bisphenols containing at least 12 carbon atoms, for example, 12 to 60 carbon atoms, or 20 to 40 carbon atoms. Examples of such copolycarbonates include a copolycarbonate comprising bisphenol A carbonate units and 2-phenyl-3,3'-bis(4-hydroxyphenyl) phthalimidine carbonate units (a BPA-PPPBP copolymer), a copolycarbonate comprising bisphenol A carbonate units and 1,1-bis(4-hydroxy-3-methylphenyl)cyclohexane carbonate units (a BPA-DMBPC copolymer), and a copolycarbonate comprising bisphenol A carbonate units and isophorone bisphenol carbonate units (available, for example, under the trade name APEC from Bayer).

The polycarbonates can have a weight average molecular weight of 10,000 to 200,000 Daltons, specifically 20,000 to 100,000 Daltons, as measured by gel permeation chromatography (GPC), using a crosslinked styrene-divinylbenzene column and calibrated to polycarbonate references. GPC samples are prepared at a concentration of 1 mg per ml, and are eluted at a flow rate of 1.5 ml per minute.

The reaction conditions for interfacial polymerization can vary, but an exemplary process generally involves dissolving or dispersing the dihydroxy compound in aqueous NaOH or KOH, adding the resulting mixture to a water-immiscible solvent, and contacting the reactants with a carbonate precursor in the presence of a catalyst such as a tertiary amine or a phase transfer catalyst, under controlled pH conditions, e.g., 8 to 10. The water-immiscible solvent can be, for example, methylene chloride, ethylene dichloride, 1,2-dichloroethane, chlorobenzene, toluene, and the like.

The carbonate precursor can be a carbonyl halide, a bishaloformate of a dihydroxy compound, or a diaryl carbonate. The carbonyl halide can be carbonyl bromide or carbonyl chloride (phosgene). The bischloroformate can be the bischloroformate of bisphenol A, hydroquinone, ethylene glycol, neopentyl glycol, or the like. The diaryl carbonate can be a diaryl carbonate of formula (5)

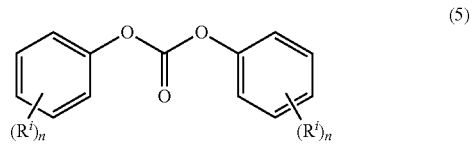

(5)

wherein n is an integer 1 to 3 and each $R^i$ is independently a linear or branched, optionally substituted $C_{1-34}$ alkyl (specifically $C_{1-6}$ alkyl, more specifically $C_{1-4}$ alkyl), $C_{1-34}$ alkoxy (specifically $C_{1-6}$ alkoxy, more specifically $C_{1-4}$ alkoxy), $C_{5-34}$ cycloalkyl, $C_{7-34}$ alkylaryl $C_{6-34}$ aryl, a halogen (specifically a chlorine), or —C(=O)OR' wherein R' is H, linear or branched $C_{1-34}$ alkyl (specifically $C_{1-6}$ alkyl, more specifically $C_{1-4}$ alkyl), $C_{1-34}$ alkoxy (specifically $C_{1-16}$ alkoxy, specifically $C_{1-4}$ alkoxy), $C_{5-34}$ cycloalkyl, $C_{7-34}$ alkylaryl, or $C_{6-34}$ aryl. In an embodiment, the diaryl carbonate is diphenyl carbonate, or a diaryl carbonate wherein one or both aryl groups have an electron-withdrawing substituent, for example, bis(4-nitrophenyl)carbonate, bis(2-chlorophenyl)carbonate, bis(4-chlorophenyl)carbonate, bis (methyl salicyl)carbonate, bis(4-methylcarboxylphenyl) carbonate, bis(2-acetylphenyl) carboxylate, bis(4-acetylphenyl) carboxylate. A molar ratio of diaryl carbonate to dihydroxy compound can be 2:1 to 1:2, or 1.5:1 to 1:1.5, or 1.05:1 to 1:1.05, or 1:1. In an embodiment, the molar ratio of the diaryl carbonate to the dihydroxy compound when expressed to three decimal places is 0.996 or less, or 0.962 to 0.996, or 0.968 to 0.996, or 0.971 to 0.994.

Combinations comprising at least one of the above described types of carbonate precursors can be used. An interfacial polymerization reaction to form carbonate linkages can use phosgene as a carbonate precursor, and is referred to as a phosgenation reaction. In the manufacture of polyester-polycarbonates by interfacial polymerization, rather than using the dicarboxylic acid or diol per se, the reactive derivatives of the acid or diol, such as the corresponding acid halides, in particular the acid dichlorides and the acid dibromides can be used. Thus, for example, instead of using isophthalic acid, terephthalic acid, or a combination comprising at least one of the foregoing acids, isophthaloyl dichloride, terephthaloyl dichloride, or a combination comprising at least one of the foregoing dichlorides can be used.

Among tertiary amines that can be used as catalysts in interfacial polymerization are aliphatic tertiary amines such as triethylamine and tributylamine, cycloaliphatic tertiary amines such as N,N-diethyl-cyclohexylamine, and aromatic tertiary amines such as N,N-dimethylaniline. Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Examples of phase transfer catalysts include $(CH_3(CH_2)_3)_4NX$, $(CH_3(CH_2)_3)_4PX$, $(CH_3(CH_2)_5)_4NX$, $(CH_3(CH_2)_6)_4NX$, $(CH_3(CH_2)_4)_4NX$, $CH_3(CH_3$ (CH$_2$)$_3$)$_3$NX, and CH$_3$(CH$_3$(CH$_2$)$_2$)$_3$NX, wherein X is Cl$^-$, Br$^-$, a C$_{1-8}$ alkoxy group or a C$_{6-18}$ aryloxy group. An effective amount of a phase transfer catalyst can be 0.1 to 10 weight percent (wt %), or 0.5 to 2 wt %, each based on the weight of bisphenol in the phosgenation mixture.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents can be added at a level of 0.05 to 2.0 wt %.

An end-capping agent (also referred to as a chain stopper agent or chain terminating agent) can be included during polymerization to provide end groups. The end-capping agent (and thus end groups) are selected based on the desired properties of the polycarbonates. Exemplary end-capping agents are exemplified by monocyclic phenols such as phenol and C$_1$-C$_{22}$ alkyl-substituted phenols such as p-cumyl-phenol, resorcinol monobenzoate, and p- and tertiary-butyl phenol, monoethers of diphenols, such as p-methoxyphenol, and alkyl-substituted phenols with branched chain alkyl substituents having 8 to 9 carbon atoms, 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, mono-carboxylic acid chlorides such as benzoyl chloride, C$_1$-C$_{22}$ alkyl-substituted benzoyl chloride, toluoyl chloride, bromobenzoyl chloride, cinnamoyl chloride, and 4-nadimidobenzoyl chloride, polycyclic, mono-carboxylic acid chlorides such as trimellitic anhydride chloride, and naphthoyl chloride, functionalized chlorides of aliphatic monocarboxylic acids, such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups can be used.

Interfacial polymerization processes to produce polycarbonate produce a mixture of an aqueous (brine) phase that generally comprises water, ions, and catalyst and an organic (polymer) phase that comprises the polycarbonate and solvent, as well as catalyst and ions. The resultant mixture can be purified via a purification process comprising a heat exchanger to heat the mixture to an elevated temperature of greater than or equal to the boiling point (T$_b$) of the organic phase solvent. The elevated temperature can be greater than or equal to 40° C., specifically, 40 to 150° C., more specifically, 50 to 120° C., even more specifically, 60 to 100° C.

An apparatus for the purification process can comprise a heat exchanger located prior to a separation unit that functions to separate the organic phase and the aqueous phase of the polymerization product mixture. Specifically, the polymerization mixture can be heated in the heat exchanger and can be directed to a non-centrifuge separation unit, such as a decanter, a coalescer, a coalescing decanter, an extraction column, and the like, where the separation unit can be operated at an elevated pressure to prevent or reduce the solvent from boiling out of the mixture. Hence, the pressure can be greater than atmospheric pressure and can be sufficiently high to maintain the solvent below its boiling point at the elevated pressure. The elevated pressure can be greater than 101.3 kilopascal (kPa), specifically, greater than 101.3 to 202.6 kPa. For example, for dichloromethane, the elevated pressure can be greater than 101.3 kilopascal (kPa), specifically, greater than 101.3 to 202.6 kPa. One of ordinary skill in the art can readily determine a suitable elevated pressure for other solvents such as ethylene chloride.

The catalyst can be extracted from the separated organic phase before the extraction of the ions, or the catalyst and the ions can be extracted in a single extraction process. For example, the catalyst can be removed from the organic phase by extraction (e.g., with an aqueous acid wash) to produce a reduced catalyst organic stream comprising the polycarbonate. The reduced catalyst organic stream can be mixed with an aqueous stream (e.g., water) under intensive agitation, and the aqueous phase containing the remaining ions can be separated from the organic phase to result in a purified polycarbonate stream. The purified polycarbonate stream can then be introduced to, for example, a flash tank to remove solvent vapor from the purified polycarbonate stream and to increase the concentration of the purified polycarbonate.

Likewise, a heat exchanger can be located before any unit that is not a centrifuge. For example, a heat exchanger can be located before a water droplet coalescer or a separation unit that functions to separate one or both of the ions and a catalyst from the organic phase. It is understood by one of ordinary skill in the art that if a centrifuge is used in the purification process downstream of a heat exchanger, the heated stream can be cooled before entering the centrifuge. It is also understood that any heat input into the system by the heat exchanger can be recovered in a subsequent process step, for example, by depressurizing and vaporizing the solvent in a flash tank after the polycarbonate has been purified.

FIG. 1 illustrates that a product mixture comprising an aqueous and an organic phase can be fed via a pump P from a tank T into a coalescer 20 to increase the size of the aqueous phase droplets in the mixture, into a heat exchanger 10, and then into decanter 22 where the aqueous phase can leave the decanter 22 as a purified aqueous stream 30. Decanters are particularly useful because they can be pressurized to allow heating of the input stream, and they can have lower purchase and maintenance (operating) costs. Decanters have been previously disfavored because they tend to be large due to the separation time required to achieve a clean split between the organic and aqueous phases.

The organic phase can then be pumped into a catalyst extraction column 40 via a pump P. The catalyst extraction column 40 can be operated in counter current mode where a low pH stream 42, for example, with a pH of less than or equal to 3, specifically, less than or equal to 2, more specifically, 0.5 to 2, even more specifically, 1 to 1.5, can be introduced into the bottom of the column and can exit at the top of the column with extracted catalyst as a catalyst rich stream 48. The separated organic stream 32 can enter the catalyst extraction column 40 at the top of the column and can leave with a reduced catalyst concentration at the bottom of the column as a reduced catalyst stream 46. The reduced catalyst stream 46 can be directed to an optional tank T and can then be pumped into a second coalescer 20 via a pump P to increase the size of any aqueous phase droplets that may be present. The stream can then enter at the top of an ion extraction column 60 that can also be a counter current extraction column. A water stream 64 can enter the bottom of the column and can exit the top of the column as an ion rich stream 68. A purified polycarbonate stream 90 can exit the bottom of the ion extraction column 60.

Figure 2:
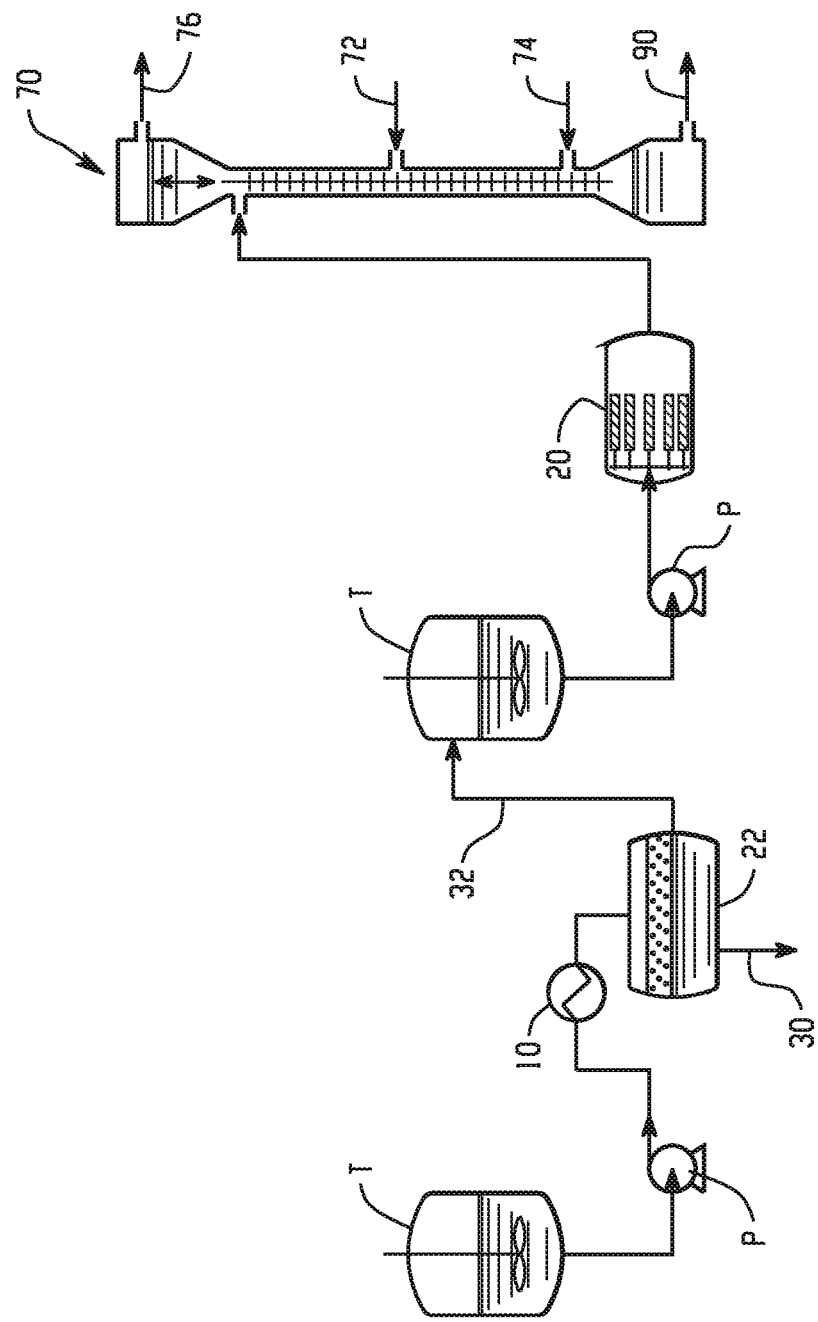
FIG. 2 is a schematic diagram of a purification process utilizing a coalescer, a heat exchanger, a decanter, and a single extraction column.

FIG. 2 illustrates a similar process as that of FIG. 1 except that after the separated organic stream 32 leaves the decanter, the separated organic stream 32 can travel through a coalescer 20 and then into a dual extraction column 70. In the dual extraction column 70, the catalyst extraction step and the ion extraction step can occur simultaneously. Specifically, the separated organic phase can enter the top of the dual extraction column 70 and can exit the bottom of the column as a purified polycarbonate stream 90. The catalyst can be removed in the upper part of the column by introducing a low pH stream 72 (between the ends of the column, e.g., near the middle of the column) and the residual ions can be removed in a lower part of the column by introducing a water stream 74 near the bottom of the column. A catalyst/ion rich stream 76 can exit the top of the column.

Figure 3:
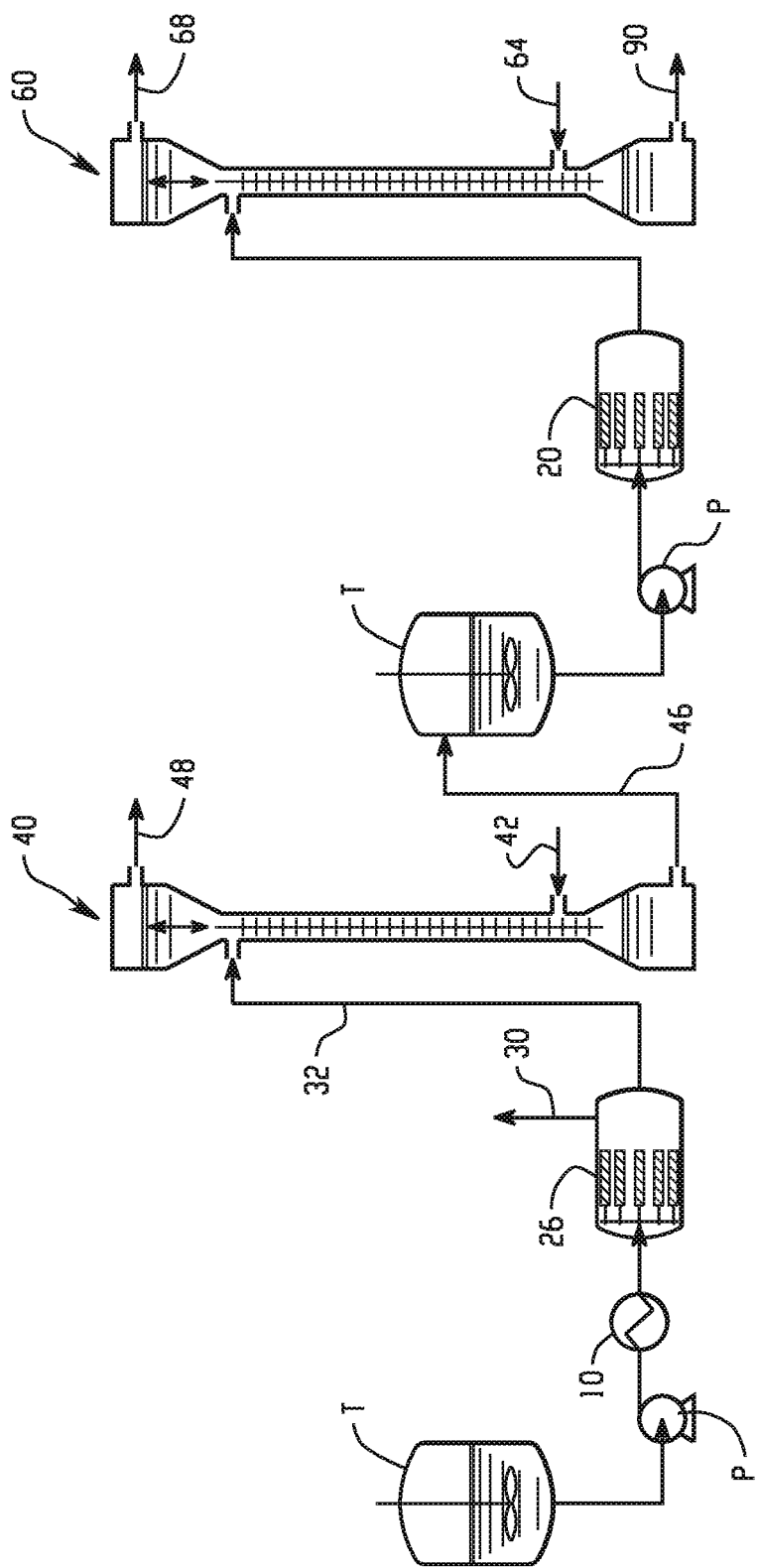
FIG. 3 is a schematic diagram of a purification process utilizing a heat exchanger, dual coalescers, and dual extraction columns.
Figure 4:
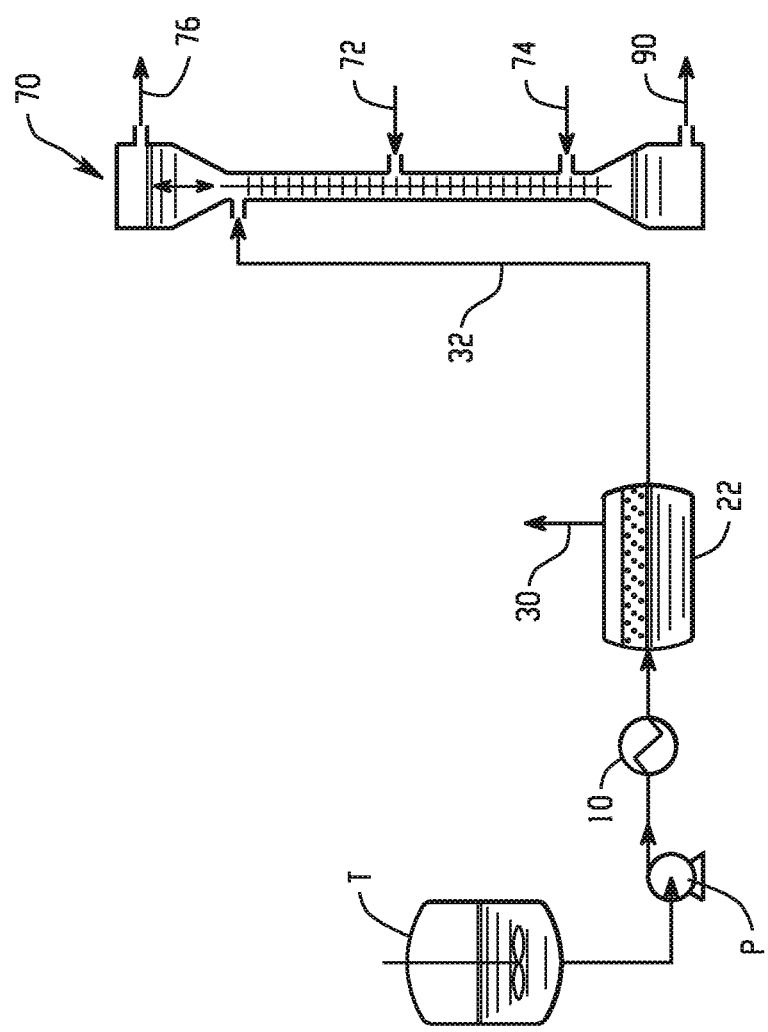
FIG. 4 is a schematic diagram of a purification process utilizing a heat exchanger, a coalescer, and a single extraction column.

FIGS. 3 and 4 illustrate a similar processes to that of FIGS. 1 and 2, respectively, except that FIG. 3 illustrates that separation of the aqueous phase and the organic phase can occur by introducing a product mixture comprising an aqueous and an organic phase via a pump P from a tank T into a heat exchanger 10 and then into a separating coalescer 26, where the aqueous phase can leave the separating coalescer 26 as a purified aqueous stream 30. FIG. 3 illustrates that the separated organic stream 32 can then be introduced to a series of extraction columns for catalyst and residual ion removal, similar to that illustrated in FIG. 1. FIG. 4 illustrates that the separated organic stream 32 can then be introduced to a dual extraction column 70 for catalyst and residual ion removal, similar to that illustrated in FIG. 2.

Figure 5:
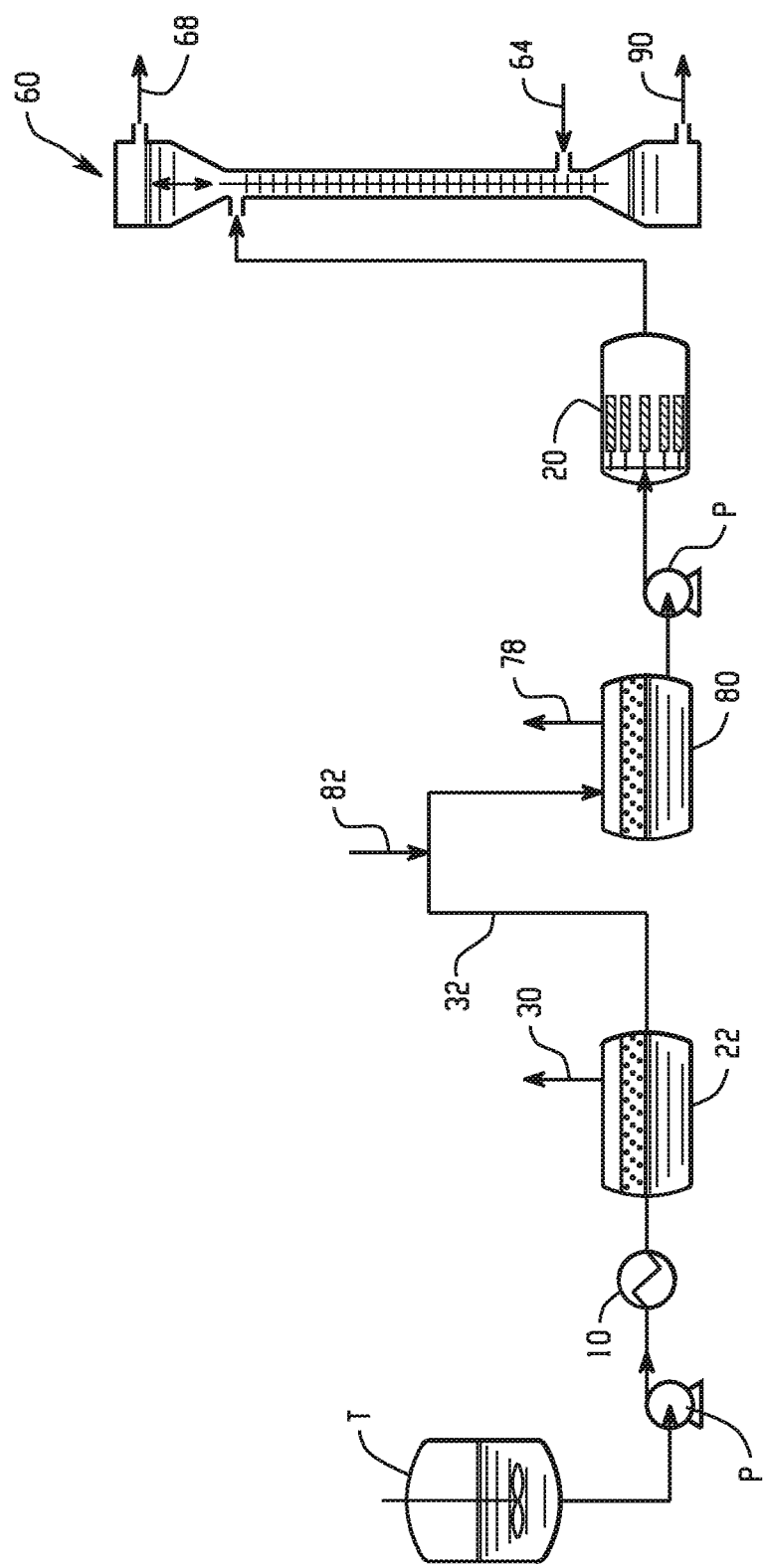
FIG. 5 is a schematic diagram of a purification process utilizing a heat exchanger, dual coalescers, a decanter, and a single extraction column.

FIG. 5 illustrates that separation of the aqueous phase and the organic phase can occur by introducing a product mixture comprising an aqueous and an organic phase via a pump P from a tank T into a heat exchanger 10 and then into a decanter 22, where the aqueous phase can leave the decanter 22 as purified aqueous stream 30. The separated organic stream 32 can then be combined with an acid stream 82 and can be introduced to a decanter 80 for an acid wash to remove the catalyst in a catalyst rich stream 78. Likewise, acid stream 82 can directly enter the decanter 80. The acid washed organic stream can be introduced to a coalescer 20 where after, the residual ions can be removed in an ion extraction column 60.

Figure 6:
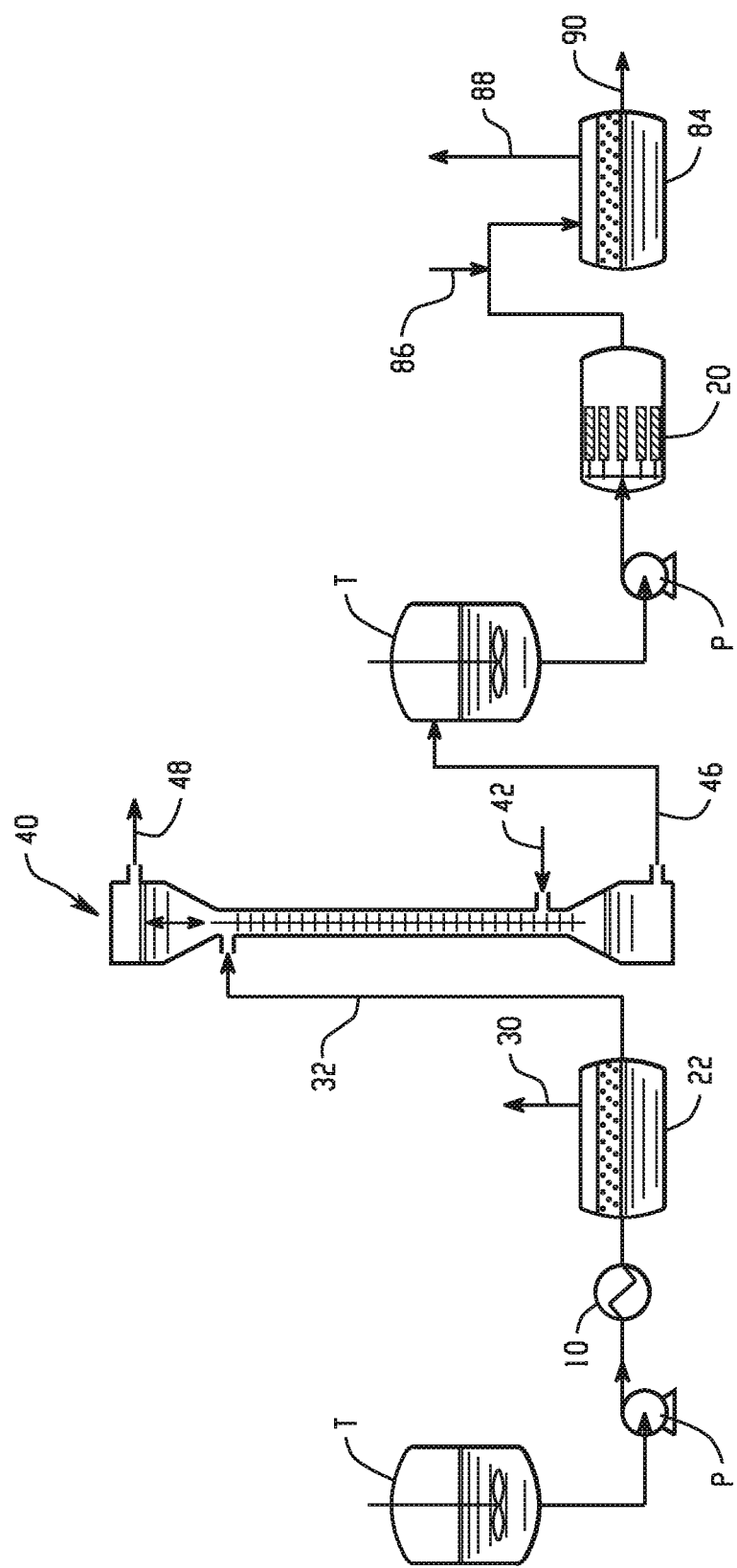
FIG. 6 is a schematic diagram of a purification process utilizing a heat exchanger, a coalescer, a single column, and a decanter.

FIG. 6 illustrates that separation of the aqueous phase and the organic phase can occur by introducing a product mixture comprising an aqueous and an organic phase via a pump P from a tank T into a heat exchanger 10 and then into a decanter 22, where the aqueous phase can leave the decanter 22 as purified aqueous stream 30. The separated organic stream 32 can leave the coalescer and can be introduced to a catalyst extraction column 40. As described in FIG. 1, the separated organic stream 32 can enter the catalyst extraction column 40 at the top of the column and can leave with a reduced catalyst concentration at the bottom of the column as a reduced catalyst stream 46. The reduced catalyst stream 46 can be directed to an optional tank T and then pumped into a coalescer 20 via a pump P. The stream can then be combined with an aqueous stream (e.g., water stream) 86 and can be introduced to a decanter 84 to remove ions. The decanter 84 can remove the ions in an ion rich stream 88 to result in a purified polycarbonate stream 90.

Figure 7:
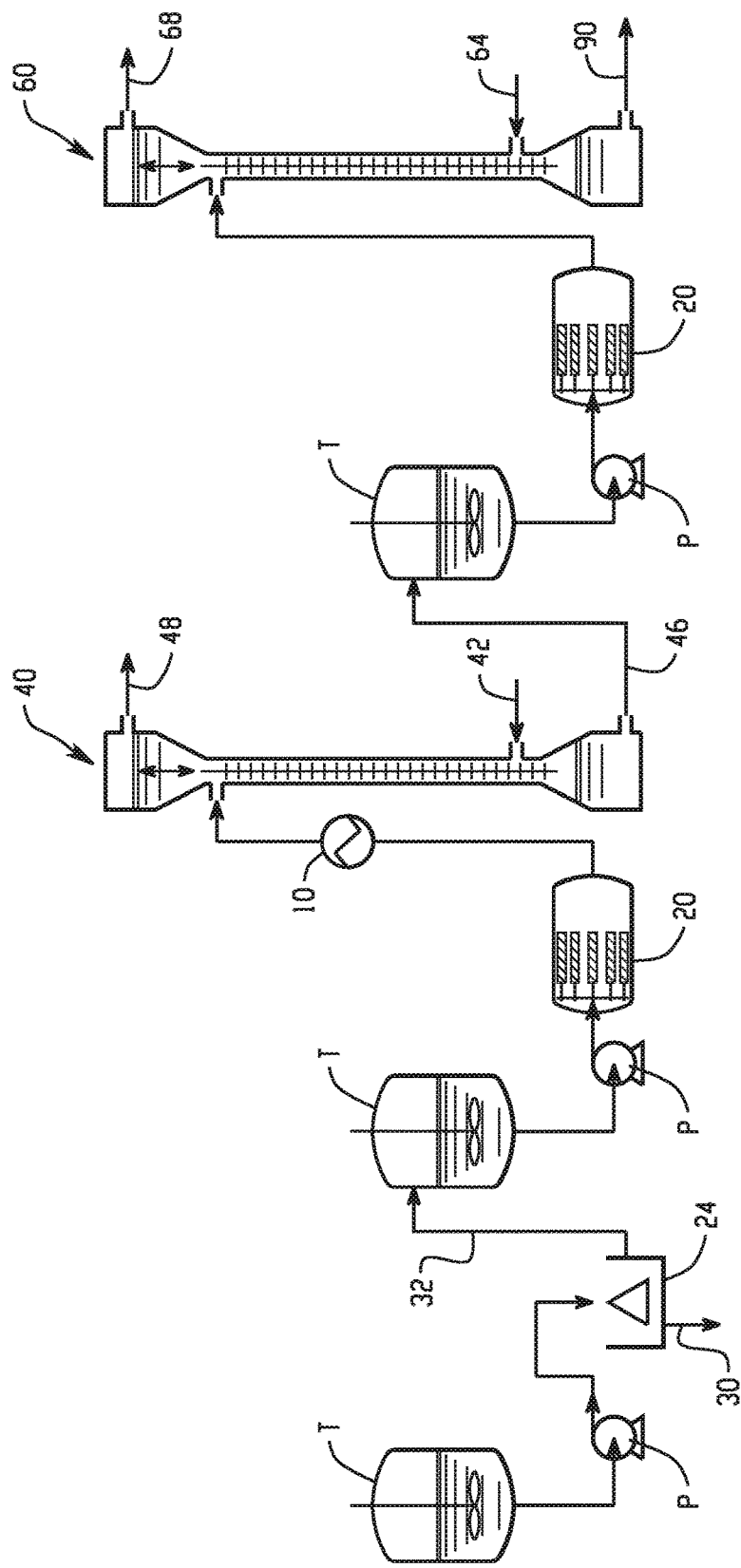
FIG. 7 is a schematic diagram of a purification process utilizing a coalescer, a centrifuge, a heat exchanger, and two separation columns.

FIG. 7 illustrates that the purification process can comprise a heat exchanger downstream from a centrifuge, for example, before a separation column. Specifically, FIG. 7 illustrates that the separation of the aqueous phase and the organic phase can occur by introducing a product mixture comprising an aqueous and an organic phase via a pump P from a tank T into a centrifuge 24, where the aqueous phase can leave the centrifuge 24 as a purified aqueous stream 30. The separated organic stream 32 can then be pumped into an optional tank T and then into a coalescer 20 via a pump P, where after, the stream can be introduced to a heat exchanger 10 and then into one or more extraction columns for catalyst and residual ion removal. It is understood that the catalyst and/or ion extraction illustrated in FIG. 7 could occur via a different separation unit.

It is understood that for any of the above described figures, if the extraction of the catalyst and/or ion was to occur via a centrifuge, that the purification process could further incorporate a heat exchanger to reduce the temperature of the stream entering the centrifuge. It is likewise understood that while the above described figures illustrate one heat exchanger to heat the stream, subsequent heat exchangers can be used to reheat streams that have cooled down to, for example, a temperature less than $T_b$.

The thermal enhancement described herein can have a number of advantages. Higher temperatures can decrease solution viscosity which can enhance the separation of organic and aqueous droplets. The lowered viscosity may also improve the mixing of the aqueous phase during catalyst and ion extraction, where the goal is to promote good contact of the wash water with aqueous droplets occluded in the organic phase. Higher temperatures can also increase diffusion coefficients which can enhance the acid extraction of catalysts such as triethylamine. Higher temperatures can also decrease emulsion stability, resulting in decreased tendency of the product mixture to emulsify. A decreased tendency toward emulsification can allow more intensive mixing and the production of finer droplet sizes without emulsification. Especially for systems with a higher tendency to emulsify, for example, copolycarbonate product mixtures, higher temperatures tend to prevent or destabilize emulsion formation which can result in improved quality of separation (i.e., low/no organic phase in the separated aqueous phase and/or low/no aqueous phase in the separated organic phase). Finally, the energy added to the purification train can be partially recovered by depressurizing and vaporizing the solvent in the solution concentration step that follows the purification process.

Polycarbonates manufactured and purified as described herein are suitable for use in a wide variety of compositions and applications as is known in the art. Thus, an additive composition can be added to the purified polycarbonate to form a polycarbonate composition. The additive composition can have one or more additives selected to achieve a desired property, with the proviso that the additive(s) are also selected so as to not significantly adversely affect a desired property of the thermoplastic composition. The additive composition or individual additives can be mixed at a suitable time during the mixing of the components for forming the composition. The additive can be soluble and/or non-soluble in polycarbonate.

The additive composition can include an impact modifier, flow modifier, filler (e.g., a particulate polytetrafluoroethylene (PTFE), glass, carbon, mineral, or metal), reinforcing agent (e.g., glass fibers), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g., a dye or pigment), surface effect additive, radiation stabilizer, flame retardant, anti-drip agent (e.g., a PTFE-encapsulated styrene-acrylonitrile copolymer (TSAN)), or a combination comprising one or more of the foregoing. For example, a combination of a heat stabilizer, mold release agent, and ultraviolet light stabilizer can be used. In general, the additives are used in the amounts generally known to be effective. For example, the total amount of the additive composition (other than any impact modifier, filler, or reinforcing agent) can be 0.001 to 10.0 wt %, or 0.01 to 5 wt %, each based on the total weight of the polymer in the composition.

Heat stabilizer additives include organophosphites (e.g., triphenyl phosphite, tris-(2,6-dimethylphenyl)phosphite, tris-(mixed mono- and di-nonylphenyl)phosphite or the like), phosphonates (e.g., dimethylbenzene phosphonate or the like), phosphates (e.g., trimethyl phosphate, or the like), or combinations comprising at least one of the foregoing heat stabilizers. The heat stabilizer can be tris(2,4-di-t-butylphenyl) phosphate available as IRGAPHOS™ 168. Heat stabilizers are generally used in amounts of 0.01 to 5 wt %, based on the total weight of polymer in the composition.

There is considerable overlap among plasticizers, lubricants, and mold release agents, which include, for example, glycerol tristearate (GTS), phthalic acid esters (e.g., octyl-4,5-epoxy-hexahydrophthalate), tris-(octoxycarbonylethyl) isocyanurate, tristearin, di- or polyfunctional aromatic phosphates (e.g., resorcinol tetraphenyl diphosphate (RDP), the bis(diphenyl) phosphate of hydroquinone and the bis(diphenyl) phosphate of bisphenol A); poly-alpha-olefins; epoxidized soybean oil; silicones, including silicone oils (e.g., poly(dimethyl diphenyl siloxanes); esters, for example, fatty acid esters (e.g., alkyl stearyl esters, such as, methyl stearate, stearyl stearate, and the like), waxes (e.g., beeswax, montan wax, paraffin wax, or the like), or combinations comprising at least one of the foregoing plasticizers, lubricants, and mold release agents. These are generally used in amounts of 0.01 to 1 wt %, based on the total weight of the polymer in the composition.

Light stabilizers, in particular ultraviolet light (UV) absorbing additives, also referred to as UV stabilizers, include hydroxybenzophenones (e.g., 2-hydroxy-4-n-octoxy benzophenone, commercially available under the trade name CYASORB 531 from Cytec), hydroxybenzotriazines (e.g., 2-[4,6-bis(2,4-dimethylphenyl)-1,3,5-triazin-2-yl]-5-(octyloxy)-phenol, commercially available under the trade name CYASORB 1164 from Cytec), cyanoacrylates (e.g., 1,3-bis [(2-cyano-3,3-diphenylacryloyl)oxy]-2,2-bis[[(2-cyano-3,3-diphenylacryloyl)oxy]methyl]propane, commercially available under the trade name UVINUL 3030), oxanilides, benzoxazinones (e.g., 2,2'-(1,4-phenylene)bis(4H-3,1-benzoxazin-4-one, commercially available under the trade name CYASORB UV-3638 from Cytec), aryl salicylates, hydroxybenzotriazoles (e.g., 2-(2-hydroxy-5-methylphenyl)benzotriazole, 2-(2-hydroxy-5-tert-octylphenyl)benzotriazole, and 2-(2H-benzotriazol-2-yl)-4-(1,1,3,3-tetramethylbutyl)phenol, commercially available under the trade name CYASORB 5411 from Cytec), inorganic materials such as titanium oxide, cerium oxide, and zinc oxide, all with particle size less than or equal to 100 nanometers, or combinations comprising at least one of the foregoing light stabilizers. The UV stabilizers can be present in an amount of 0.01 to 1 wt %, specifically, 0.1 to 0.5 wt %, and more specifically, 0.15 to 0.4 wt %, based upon the total weight of polymer in the composition.

The polycarbonate compositions can be manufactured by various methods known in the art. For example, powdered polycarbonate, and other optional components are first blended, optionally with any fillers, in a high speed mixer or by hand mixing. The blend is then fed into the throat of a twin-screw extruder via a hopper. Alternatively, at least one of the components can be incorporated into the composition by feeding it directly into the extruder at the throat and/or downstream through a sidestuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming.

Shaped, formed, or molded articles comprising the polycarbonate compositions are also provided. The polycarbonate compositions can be formed into useful shaped articles by a variety of methods such as extrusion, calendaring, molding (e.g., injection molding, rotational molding, blow molding, compression molding), thermoforming, and combinations comprising at least one of these methods. Some examples of articles include computer and business machine housings such as housings for monitors, handheld electronic device housings such as housings for cell phones, electrical connectors, and components of lighting fixtures (e.g., luminaires, headlights, and so forth), ornaments, home appliances, roofs, greenhouses, sun rooms, swimming pool enclosures, medical devices, containers (e.g., food containers), and the like.

In an embodiment, provided herein is a process of purifying polycarbonate comprising: polymerizing a dihydroxy compound and a carbonate source via an interfacial reaction in the presence of a catalyst to provide a product mixture comprising an aqueous phase and an organic phase, wherein the organic phase comprises the polycarbonate, catalyst, ions, and a solvent having a boiling point $T_b$ at atmospheric pressure; heating the product mixture to a temperature greater than or equal to the boiling point $T_b$; separating the aqueous phase and the organic phase of the heated product mixture at a temperature greater than or equal to the boiling point $T_b$; extracting the catalyst from the separated organic phase; and extracting the ions from the separated organic phase; wherein if a centrifuge is used in extracting the catalyst, the ions, or both, the process further comprises cooling a stream entering the centrifuge to a temperature less than the boiling point $T_b$.

In specific embodiments of the foregoing process, one or more of the following conditions can apply: the separating occurs via a separating coalescer, a decanter, or a combination comprising one or more of the foregoing; the separating occurs via a decanter; the extracting the catalyst occurs before the extracting the ions, to form a reduced catalyst stream; both the extracting the catalyst and the extracting the ions are by other than a centrifuge; or the extracting the catalyst and the extracting the ions occur at the same time, and wherein the extracting is by other than a centrifuge.

Also provided herein is a process of purifying polycarbonate comprising: polymerizing a dihydroxy compound and a carbonate source via an interfacial reaction in the presence of a catalyst to provide a product mixture comprising an aqueous phase and an organic phase, wherein the organic phase comprises the polycarbonate, catalyst, ions, and a solvent having a boiling point $T_b$ at atmospheric pressure; separating the aqueous phase and the organic phase via a centrifuge; heating the separated organic phase to a temperature greater than or equal to the boiling point $T_b$; extracting the catalyst from the separated organic phase; and extracting the ions from the separated organic phase;

wherein at least one of the extracting the catalyst and the ions occurs by other than a centrifuge at a temperature greater than or equal to the boiling point $T_b$, and if the extracting the catalyst or the ions occurs with a centrifuge, then the heating does not occur before that step or the process further comprises cooling a stream entering the centrifuge to a temperature of less than the boiling point $T_b$.

In specific embodiments of the foregoing process, one or more of the following conditions can apply: the extracting the catalyst occurs before the extracting the ions; the extracting the catalyst occurs at the same time as the extracting the ions, and wherein the extracting is by other than a centrifuge; or both the extracting the catalyst and the extracting the ions are by other than a centrifuge.

Also provided herein is a process of purifying polycarbonate comprising: polymerizing a dihydroxy compound and a carbonate source via an interfacial reaction in the presence of a catalyst to provide a product mixture comprising an aqueous phase and an organic phase, wherein the organic phase comprises the polycarbonate, catalyst, ions, and a solvent having a boiling point $T_b$ at atmospheric pressure; heating the product mixture to a temperature greater than or equal to the boiling point $T_b$; separating the aqueous phase and the organic phase of the heated product mixture at a temperature greater than or equal to the boiling point $T_b$, wherein the separating is by a separating coalescer; extracting the catalyst from the separated organic phase in a first extraction column to provide a reduced catalyst organic stream; and extracting the ions from the reduced catalyst organic stream by combining the reduced catalyst stream with an aqueous stream in a decanter; wherein the separated organic phase, or the reduced catalyst organic stream, or the aqueous stream, or a combination comprising at least one of the foregoing are at a temperature greater than or equal to the boiling point $T_b$ during extracting the residual catalyst and ions, respectively.

In specific embodiments of the foregoing process, one or more of the following condition can apply: the separated organic phase, and the reduced catalyst organic stream, and the aqueous stream, are at a temperature greater than or equal to the boiling point $T_b$ during extracting the residual catalyst and ions, respectively; or the process further comprising treating the reduced catalyst organic stream in a coalescer before extracting the ions.

Also provided herein is a process of purifying polycarbonate comprising: polymerizing a dihydroxy compound and a carbonate source via an interfacial reaction in the presence of a catalyst to provide a product mixture comprising an aqueous phase and an organic phase, wherein the organic phase comprises the polycarbonate, catalyst, ions, and a solvent having a boiling point $T_b$ at atmospheric pressure; heating the product mixture to a temperature greater than or equal to the boiling point $T_b$; separating the aqueous phase and the organic phase of the heated product mixture at a temperature greater than or equal to the boiling point $T_b$, wherein the separating is by a decanter; extracting the catalyst from the separated organic phase in a first extraction column to provide a reduced catalyst organic stream; and extracting the ions from the reduced catalyst organic stream by combining the reduced catalyst stream with an aqueous stream in a coalescing decanter; wherein the separated organic phase, or the reduced catalyst organic stream, or the aqueous stream, or a combination comprising at least one of the foregoing are at a temperature greater than or equal to the boiling point $T_b$ during extracting the residual catalyst and ions, respectively. Optionally, the separated organic phase, and the reduced catalyst organic stream, and the aqueous stream, are at a temperature greater than or equal to the boiling point $T_b$ during extracting the residual catalyst and ions, respectively.

In specific embodiments of the foregoing processes, one or more of the following condition can apply: the solvent comprises methylene chloride; the temperature is greater than or equal to $T_b+5°$ C.; the temperature is $T_b+20°$ C.; the extracting of one or both of the catalyst and the ions by other than a centrifuge occurs via an extraction column, a separating coalescer, a decanter, or a combination comprising one or more of the foregoing; the polycarbonate is a bisphenol A homopolymer, a copolycarbonate comprising bisphenol A carbonate units and bulky bisphenol carbonate units derived from a bisphenol having at least 12 carbon atoms, or a polyestercarbonate comprising bisphenol A carbonate units and terephthalate-isophthalate acid-bisphenol A ester units; or the polycarbonate is a copolycarbonate comprising bisphenol A carbonate units and 2-phenyl-3,3'-bis(4-hydroxyphenyl) phthalimidine carbonate units, a copolycarbonate comprising bisphenol A carbonate units and 1,1-bis(4-hydroxy-3-methylphenyl)cyclohexane carbonate units, or a copolycarbonate comprising bisphenol A carbonate units and isophorone bisphenol carbonate units.

The following examples are provided to illustrate the method of purification of an interfacial polycarbonate reaction product comprising an aqueous phase and an organic phase, including heating a combination of an aqueous phase and an organic phase when a centrifuge is not used. The examples are merely illustrative and are not intended to limit compositions, methods, or devices made in accordance with the disclosure to the materials, conditions, or process parameters set forth therein.

EXAMPLES

Examples 1-4

Emulsion Stability

Emulsion stability of a solution comprising an organic phase comprising BPA-PPPBP copolycarbonate (made by interfacial polymerization and sourced from SABIC's Innovative Plastics business) in methylene chloride and a water phase at different temperatures was determined. Two emulsified solutions, one comprising 15 wt % BPA-PPPBP copolycarbonate and the other comprising 10 wt % of BPA-PPPBP copolycarbonate, were added to glass columns at a temperature of 65° C. and a pressure of 20 pounds per square inch (psi) (138 kPa). The solutions were allowed to sit without mixing to determine the time for separation to begin. These solutions were compared to room temperature samples. The results are shown in Table 1.

TABLE 1

|  | Example | | | |
| --- | --- | --- | --- | --- |
|  | 1 | 2 | 3 | 4 |
| Polycarbonate concentration (wt %) | 15 | 15 | 10 | 10 |
| Temperature (° C.) | 65 | 23 | 65 | 23 |
| Time to separation (min) | 80 | 140+ | 60 | 330 |

Table 1 shows that there is a significant improvement in the separation times of emulsions at increased temperatures.

Examples 5-9

An aqueous phase and a resin solution were first prepared separately, where the aqueous phase was 15 wt % sodium chloride solution in water and the resin solution was an XHT™ PPPBP/BPA copolycarbonate having a weight average molecular weight of 22,000 to 24,000 g/mol commercially available from SABIC's Innovative Plastics business) polycarbonate solution in methylene chloride. After dissolving sodium chloride in DI water and XHT powder in methylene chloride, the two solutions were blended in the blender (Waring Commercial Blender with 4 liters cup) at "low" setting for 30 seconds to create the emulsion. The emulsion was stable in that a sample of prepared emulsion did not show phase separation after one week of creation. The emulsion was further characterized by measuring the dispersed phase (i.e., aqueous phase) droplet size distribution. Droplet size data was obtained using an instrument FBRM G400 manufactured by Mettler Toledo. Data showed that droplet size distribution was as follows: 90% of droplets created have a diameter less than 11.5 micrometers, 50% of droplets have a diameter less than 4.5 micrometers, while 10% of droplets have a diameter less than 2 micrometer. In Example 5-9, the volumetric percent of aqueous phase in the created emulsion varied from 14.8 to 33.3 vol %, which corresponds to a ratio of aqueous phase to organic phase of 2.0 to 5.8 and the polycarbonate concentration in solvent was set at 9 wt %.

Figure 8:
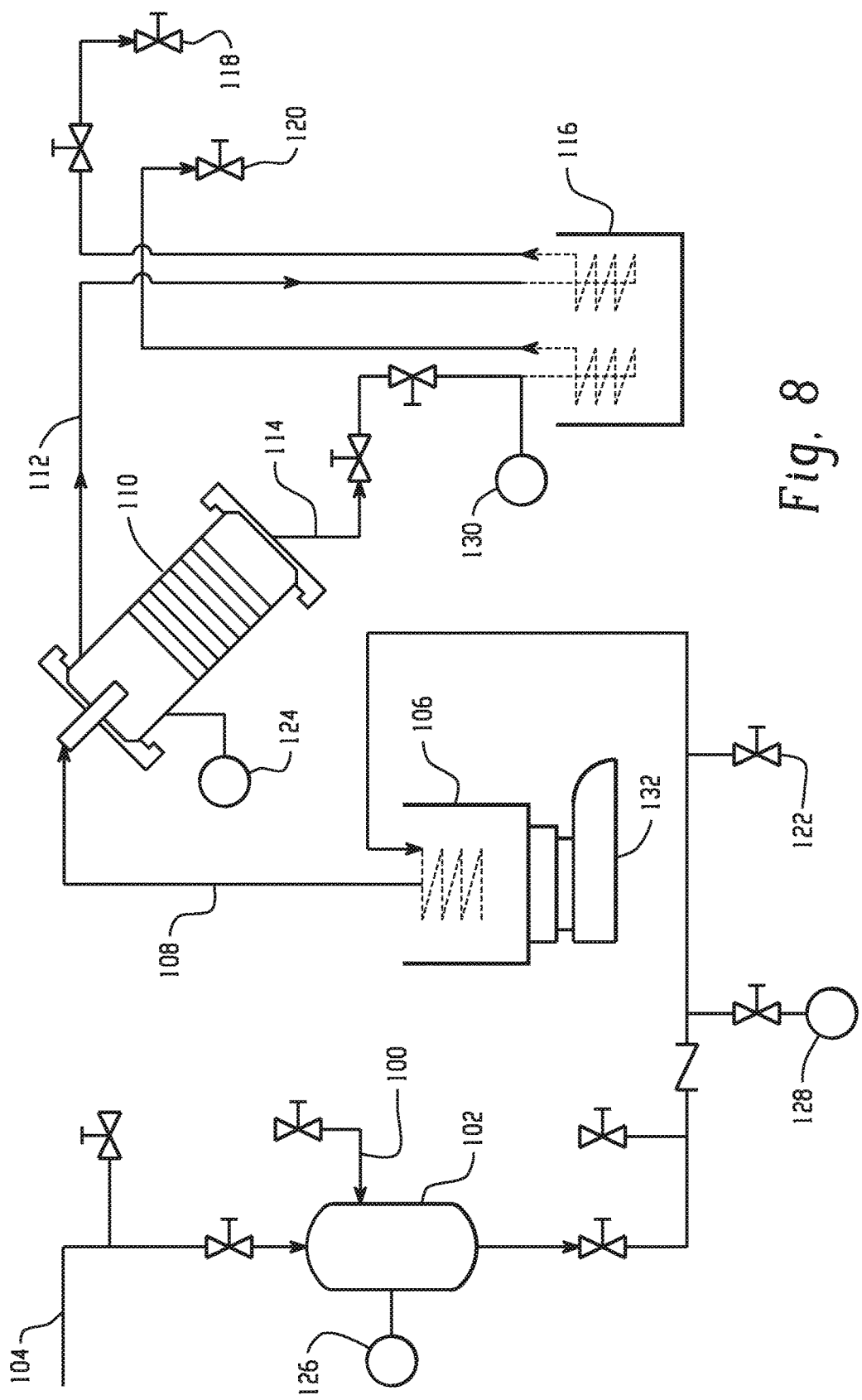
FIG. 8 is a schematic diagram of the experimental set-up for Examples 5-9.

The experimental set-up used in Examples 5-9 is illustrated in FIG. 8, where the prepared emulsion was fed as emulsion stream 100 into the feed tank 102. Hot plate 132 and the heating jacket of the decanter 124 were turned on. The emulsion was sent to oil bath 106 to increase its temperature, where a thermometer was placed in oil bath 106 to measure the temperature of the oil bath. When the oil bath reached temperature of 100° C., the bottom outlet of the decanter 124 was closed, the feed was pressurized with nitrogen via pressurized nitrogen stream 104, and then fed from the bottom of the feed tank 102. Heated emulsion stream 108 was then sent to decanter 110, in which the emulsion was broken into two phases: heavier, resin solution, and the lighter, aqueous phase. Decanter 110 was 3 inches in diameter and 8 inches long and was equipped with the electrical heating blanket to maintain the temperature of liquid in the decanter after heating in the oil bath. Temperatures of the heated emulsion were measured using temperature gauge 124 placed into the liquid in decanter 110. Oil bath temperature was regulated to achieve desired temperature in the decanter indicated by temperature gauge 124. Decanter 110 was filled with feed until there was a stream exiting through top sampling point 118. The bottom outlet valve of decanter 110 was opened after the decanter was filled and the heavy phase and the light phase exited the decanter through bottom stream 114 and top stream 112, respectively. Valves of top and bottom sampling points 118 and 120 were adjusted to set flow rates. Bottom stream 114 and top stream 112 were passed through ice bath 116 to reduce their temperature before exiting the system. Top stream 112 and bottom stream 114 were sampled at the two sampling points 118 and 120, respectively and the feed emulsion was sampled at the feed sampling point 122. Samples were centrifuged in the lab centrifuge and volume fraction of each phase was determined for each sampling point 118, 120, and 122. Pressure in the system was monitored in three locations using pressure gauges 126, 128, and 130. Emulsion flow rate was controlled using valves and measured by measuring the time it takes to collect set amount of volume in the combined outflow coming from sampling points 118 and 120. Based on decanter volume and flow rate, residence time in the decanter was determined for each experimental condition.

The results of Examples 5-9 are shown in Table 2.

TABLE 2

| | Example | | | | |
|---|---|---|---|---|---|
| | 5 | 6 | 7 | 8 | 9 |
| Flow rate (mL/min) | 165 | 20 | 105 | 50 | 40 |
| Residence time in the decanter (min) | 5.6 | 46.3 | 8.8 | 18.5 | 23.2 |
| Temperature of liquid in the decanter, (° C.) | 73 | 65 | 72 | 72 | 74 |
| Vol % of aqueous phase in the emulsion going to the decanter | 14.8 | 21.4 | 17.1 | 22.2 | 33.3 |
| Vol % of aqueous phase in the organic phase at the decanter outlet | 4.3 | 5.0 | 2.4 | 10.0 | 5.0 |
| Vol % of organic phase in the aqueous phase at the decanter outlet | 0 | 0 | 0 | 0 | 0 |

Table 2 shows that the temperature of liquid in the decanter varied from 65 to 74° C. and the residence time in the decanter varied between 5.6 and 46.3 min. In all the results shown, the emulsions were broken by heat treatment. Also, in all the runs, a clean aqueous phase was recovered coming out of the decanter, where the volumetric percent of organic phase in the aqueous phase at the decanter outlet was zero for all runs. Residual aqueous phase in the organic phase coming out of the decanter was between 2.4 and 10.0 vol % depending on the temperature and residence time in the decanter.

Set forth below are some embodiments of the present method of purifying a polycarbonate.

Embodiment 1 a process of purifying a polycarbonate comprising: polymerizing a dihydroxy compound and a carbonate source via an interfacial reaction in the presence of a catalyst to form a product mixture comprising an aqueous phase and an organic phase, wherein the organic phase comprises the polycarbonate, the catalyst, ions, and a solvent having a boiling point $T_b$ at atmospheric pressure; heating the product mixture to a temperature greater than or equal to the boiling point $T_b$ to form a heated product mixture; separating the aqueous phase and the organic phase of the heated product mixture at a temperature greater than or equal to the boiling point $T_b$ to form a separated organic phase and a separated aqueous phase; extracting the catalyst from the separated organic phase; and extracting the ions from the separated organic phase to form a purified polycarbonate; wherein if a centrifuge is used in the extracting of the catalyst, the extracting of the ions, or both, the process further comprises cooling a stream entering the centrifuge to a temperature less than the boiling point $T_b$.

Embodiment 2 a process of purifying polycarbonate comprising: polymerizing a dihydroxy compound and a carbonate source via an interfacial reaction in the presence of a catalyst to provide a product mixture comprising an aqueous phase and an organic phase, wherein the organic phase comprises the polycarbonate, the catalyst, ions, and a solvent having a boiling point $T_b$ at atmospheric pressure; separating the aqueous phase and the organic phase via a centrifuge to form a separated organic phase and a separated aqueous phase;

heating the separated organic phase to a temperature greater than or equal to the boiling point $T_b$ to form a heated separated organic phase; extracting the catalyst from the heated separated organic phase; and extracting the ions from the heated separated organic phase to form a purified polycarbonate; wherein at least one of the extracting the catalyst and the extracting the ions occurs by other than a centrifuge at a temperature greater than or equal to the boiling point $T_b$, and if the extracting the catalyst or the extracting the ions occurs with a centrifuge, then the heating occurs after the extracting the catalyst or the extracting the ions occurs with the centrifuge, or the process further comprises cooling a stream entering the centrifuge to a temperature of less than the boiling point $T_b$.

Embodiment 3 the process of any of Embodiments 1-2, wherein the separating occurs via a separating coalescer, a decanter, or a combination comprising one or more of the foregoing.

Embodiment 4 the process of Embodiment 3, wherein the separating occurs via a decanter.

Embodiment 5 the process of any of Embodiments 1-4, wherein the extracting of the catalyst occurs before the extracting of the ions.

Embodiment 6 the process of any of Embodiments 1-4, wherein the extracting of the catalyst and the extracting of the ions occur at the same time.

Embodiment 7 a process of purifying polycarbonate comprising: polymerizing a dihydroxy compound and a carbonate source via an interfacial reaction in the presence of a catalyst to form a product mixture comprising an aqueous phase and an organic phase, wherein the organic phase comprises the polycarbonate, the catalyst, ions, and a solvent having a boiling point $T_b$ at atmospheric pressure; heating the product mixture to a temperature greater than or equal to the boiling point $T_b$ to provide a heated product mixture; separating the aqueous phase and the organic phase of the heated product mixture at a temperature greater than or equal to the boiling point $T_b$ to form a separated organic phase and a separated aqueous phase, wherein the separating is by one or both of a separating coalesce and a decanter; extracting the catalyst from the separated organic phase in a first extraction column to form a reduced catalyst organic stream; and extracting the ions from the reduced catalyst organic stream by combining the reduced catalyst organic stream with an aqueous stream in a decanter to form a purified polycarbonate; wherein the separated organic phase, the reduced catalyst organic stream, the aqueous stream, or a combination comprising at least one of the foregoing are at a temperature greater than or equal to the boiling point $T_b$ during the extracting the catalyst and the extracting the ions.

Embodiment 8 a process of purifying polycarbonate comprising: polymerizing a dihydroxy compound and a carbonate source via an interfacial reaction in the presence of a catalyst to provide a product mixture comprising an aqueous phase and an organic phase, wherein the organic phase comprises the polycarbonate, the catalyst, ions, and a solvent having a boiling point $T_b$ at atmospheric pressure; heating the product mixture to a temperature greater than or equal to the boiling point $T_b$; separating the aqueous phase and the organic phase of the heated product mixture at a temperature greater than or equal to the boiling point $T_b$ to form a separated organic phase and a separated aqueous phase, wherein the separating is by a decanter; extracting the catalyst from the separated organic phase in a first extraction column to provide a reduced catalyst organic stream; and extracting the ions from the reduced catalyst organic stream by combining the reduced catalyst stream with an aqueous stream in a coalescing decanter to form a purified polycarbonate; wherein the separated organic phase, the reduced catalyst organic stream, the aqueous stream, or a combination comprising at least one of the foregoing are at a temperature greater than or equal to the boiling point $T_b$ during extracting the residual catalyst and the extracting the ions.

Embodiment 9 the process of any of Embodiments 7-8, wherein the separated organic phase, and the reduced catalyst organic stream, and the aqueous stream, are at a temperature greater than or equal to the boiling point $T_b$.

Embodiment 10 the process of any of Embodiments 7-9, further comprising treating the reduced catalyst organic stream in a coalescer before extracting the ions.

Embodiment 11 the process of any of Embodiments 1-10, wherein both the extracting the catalyst and the extracting the ions are by other than a centrifuge.

Embodiment 12 the process of any of Embodiments 1-11, wherein the separating, the extracting the catalyst, and the extracting the ions occur at a temperature greater than or equal to the boiling point $T_b$.

Embodiment 13 the process of any of Embodiments 1-12, wherein the solvent comprises methylene chloride.

Embodiment 14 the process of any of Embodiments 1-13, wherein the temperature is greater than or equal to $T_b+5°$ C.

Embodiment 15 the process of any of Embodiments 1-14, wherein the temperature is greater than or equal to $T_b+20°$ C.

Embodiment 16 the process of any of Embodiments 1-15, wherein one or both of the extracting the catalyst and the extracting the ions occurs via an extraction column, a separating coalescer, a decanter, or a combination comprising one or more of the foregoing.

Embodiment 17 the process of any of Embodiments 1-16, wherein the polycarbonate comprises a bisphenol A homopolymer, a copolycarbonate comprising bisphenol A carbonate units and bulky bisphenol carbonate units derived from a bisphenol having at least 12 carbon atoms, or a polyestercarbonate comprising bisphenol A carbonate units and terephthalate-isophthalate acid-bisphenol A ester units.

Embodiment 18 the process of Embodiment 17, wherein the polycarbonate comprises a copolycarbonate comprising bisphenol A carbonate units and 2-phenyl-3,3'-bis(4-hydroxyphenyl)phthalimidine carbonate units, a copolycarbonate comprising bisphenol A carbonate units and 1,1-bis(4-hydroxy-3-methylphenyl)cyclohexane carbonate units, or a copolycarbonate comprising bisphenol A carbonate units and isophorone bisphenol carbonate units.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt %, or, more specifically, 5 to 20 wt %", is inclusive of the endpoints and all intermediate values of the ranges of "5 to 25 wt %," etc.). Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or" unless clearly dictated otherwise by context. Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. A process of purifying a polycarbonate comprising:
polymerizing a dihydroxy compound and a carbonate source via an interfacial reaction in the presence of a catalyst to form a product mixture comprising an aqueous phase and an organic phase, wherein the organic phase comprises the polycarbonate, the catalyst, ions, and a solvent having a boiling point $T_b$ at atmospheric pressure;
heating the product mixture to a temperature greater than or equal to the boiling point $T_b$ to form a heated product mixture;
separating the aqueous phase and the organic phase of the heated product mixture at a temperature greater than or equal to the boiling point $T_b$ to form a separated organic phase and a separated aqueous phase;
extracting the catalyst from the separated organic phase; and
extracting the ions from the separated organic phase to form a purified polycarbonate;
wherein if a centrifuge is used in the extracting of the catalyst, the extracting of the ions, or both, the process further comprises cooling a stream entering the centrifuge to a temperature less than the boiling point $T_b$.

2. A process of purifying polycarbonate comprising:
polymerizing a dihydroxy compound and a carbonate source via an interfacial reaction in the presence of a catalyst to provide a product mixture comprising an aqueous phase and an organic phase, wherein the organic phase comprises the polycarbonate, the catalyst, ions, and a solvent having a boiling point $T_b$ at atmospheric pressure;
separating the aqueous phase and the organic phase via a centrifuge to form a separated organic phase and a separated aqueous phase;
heating the separated organic phase to a temperature greater than or equal to the boiling point $T_b$ to form a heated separated organic phase;
extracting the catalyst from the heated separated organic phase; and
extracting the ions from the heated separated organic phase to form a purified polycarbonate;
wherein
at least one of the extracting the catalyst and the extracting the ions occurs by other than a centrifuge at a temperature greater than or equal to the boiling point $T_b$, and
if the extracting the catalyst or the extracting the ions occurs with a centrifuge, then
the heating occurs after the extracting the catalyst or the extracting the ions occurs with the centrifuge, or
the process further comprises cooling a stream entering the centrifuge to a temperature of less than the boiling point $T_b$.

3. The process of claim 1, wherein the separating occurs via a separating coalescer, a decanter, or a combination comprising one or more of the foregoing.

4. The process of claim 3, wherein the separating occurs via a decanter.

5. The process of claim 1, wherein the extracting of the catalyst occurs before the extracting of the ions.

6. The process of claim 1, wherein the extracting of the catalyst and the extracting of the ions occur at the same time.

7. A process of purifying polycarbonate comprising:
polymerizing a dihydroxy compound and a carbonate source via an interfacial reaction in the presence of a catalyst to form a product mixture comprising an aqueous phase and an organic phase, wherein the organic phase comprises the polycarbonate, the catalyst, ions, and a solvent having a boiling point $T_b$ at atmospheric pressure;
heating the product mixture to a temperature greater than or equal to the boiling point $T_b$ to provide a heated product mixture;

separating the aqueous phase and the organic phase of the heated product mixture at a temperature greater than or equal to the boiling point $T_b$ to form a separated organic phase and a separated aqueous phase, wherein the separating is by one or both of a separating coalesce and a decanter;

extracting the catalyst from the separated organic phase in a first extraction column to form a reduced catalyst organic stream; and extracting the ions from the reduced catalyst organic stream by combining the reduced catalyst organic stream with an aqueous stream in a decanter to form a purified polycarbonate;

wherein the separated organic phase, the reduced catalyst organic stream, the aqueous stream, or a combination comprising at least one of the foregoing are at a temperature greater than or equal to the boiling point $T_b$ during the extracting the catalyst and the extracting the ions.

8. The process of claim 7,
wherein the separating is by a decanter; and
wherein the extracting the ions from the reduced catalyst organic stream by combining the reduced catalyst stream with the aqueous is in a coalescing decanter to form the purified polycarbonate.

9. The process of claim 7, wherein the separated organic phase, and the reduced catalyst organic stream, and the aqueous stream, are at a temperature greater than or equal to the boiling point $T_b$.

10. The process of claim 7, further comprising treating the reduced catalyst organic stream in a coalescer before extracting the ions.

11. The process of claim 1, wherein both the extracting the catalyst and the extracting the ions are by other than a centrifuge.

12. The process of claim 1, wherein the separating, the extracting the catalyst, and the extracting the ions occur at a temperature greater than or equal to the boiling point $T_b$.

13. The process of claim 1, wherein the solvent comprises methylene chloride.

14. The process of claim 1, wherein the temperature is greater than or equal to $T_b+5°$ C.

15. The process of claim 1, wherein the temperature is greater than or equal to $T_b+20°$ C.

16. The process of claim 1, wherein one or both of the extracting the catalyst and the extracting the ions occurs via an extraction column, a separating coalescer, a decanter, or a combination comprising one or more of the foregoing.

17. The process of claim 1, wherein the polycarbonate comprises a bisphenol A homopolymer, a copolycarbonate comprising bisphenol A carbonate units and bulky bisphenol carbonate units derived from a bisphenol having at least 12 carbon atoms, or a polyestercarbonate comprising bisphenol A carbonate units and terephthalate-isophthalate acid-bisphenol A ester units.

18. The process of claim 17, wherein the polycarbonate comprises a copolycarbonate comprising bisphenol A carbonate units and 2-phenyl-3,3'-bis(4-hydroxyphenyl) phthalimidine carbonate units, a copolycarbonate comprising bisphenol A carbonate units and 1,1-bis(4-hydroxy-3-methylphenyl)cyclohexane carbonate units, or a copolycarbonate comprising bisphenol A carbonate units and isophorone bisphenol carbonate units.

19. The process of claim 7, wherein the temperature is greater than or equal to $T_b+5°$ C.

20. The process of claim 7, wherein the temperature is greater than or equal to $T_b+20°$ C.

\* \* \* \* \*